May 2, 1961  G. C. CONTRERAS  2,982,415
PORTABLE IRRIGATION FILTER
Filed May 8, 1957  2 Sheets-Sheet 1
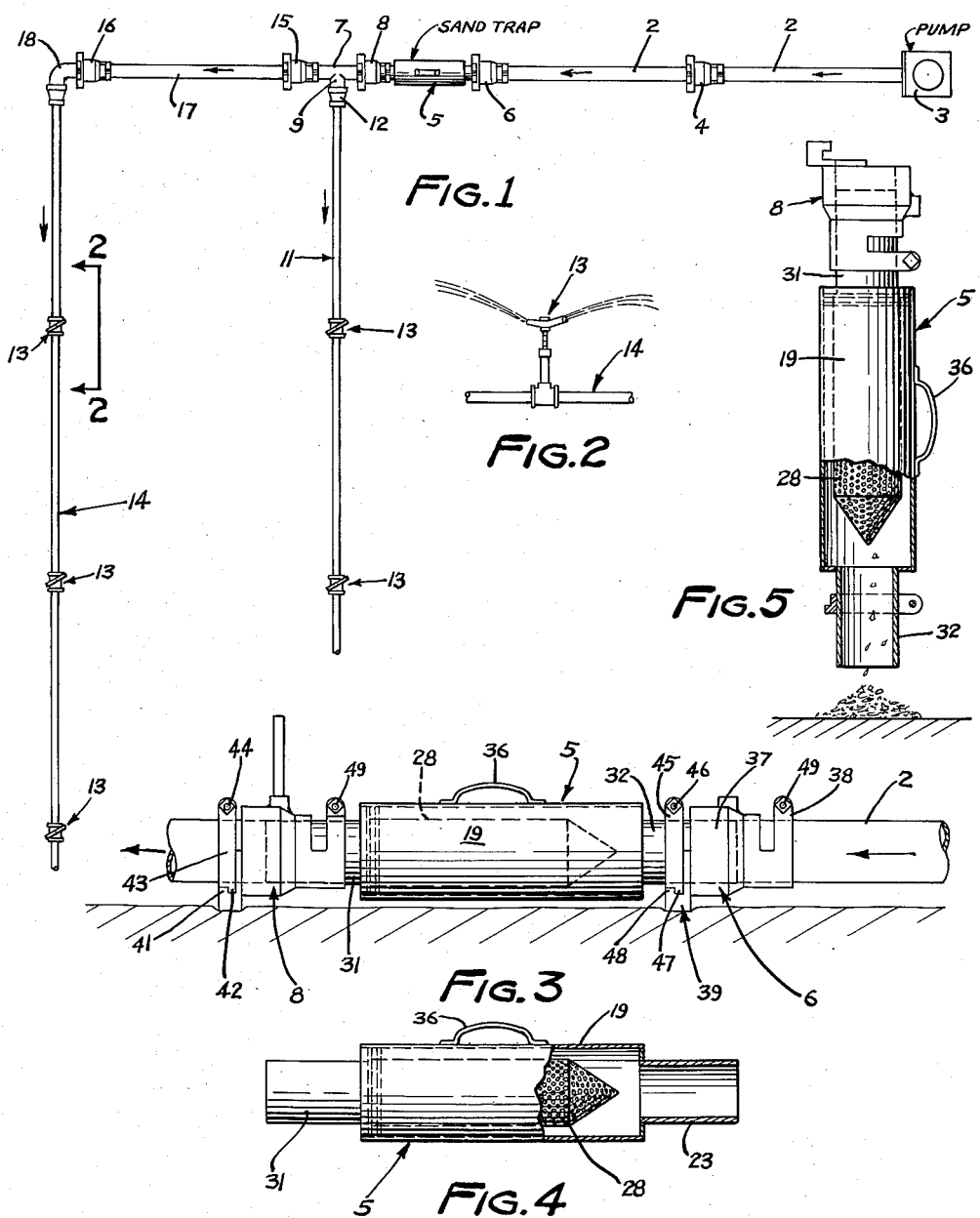
INVENTOR.
GEORGE C. CONTRERAS
BY
Moore, White & Burd
ATTORNEYS May 2, 1961  G. C. CONTRERAS  2,982,415
PORTABLE IRRIGATION FILTER
Filed May 8, 1957  2 Sheets-Sheet 2

INVENTOR.
GEORGE C. CONTRERAS
BY Moore, White & Burd
ATTORNEYS

2,982,415
PORTABLE IRRIGATION FILTER
George C. Contreras, Box 945, Murrieta, Calif.
Filed May 8, 1957, Ser. No. 657,790
1 Claim. (Cl. 210—232)

This invention relates to new and useful improvements in irrigation systems, generally, and more particularly to a novel portable sand trap having means for detachably securing it in the main supply or branch lines of the system, thereby to prevent foreign matter drawn into the system by the usual pumping means from reaching the sprinkler heads of the system and interrupting the normal flow of water therefrom.

Large growers of fruits, vegetables, and various other crops, have discovered that they can not depend upon the natural precipitation for supplying adequate moisture to sustain their crops at maximum growth. To compensate for such lack of moisture, forced watering of the crops has been resorted to in recent years, requiring the installation of irrigation systems. These usually comprise pipe lines which commonly are laid on top of the ground and through which water is pumped under pressure to the usual sprinkler heads provided at spaced intervals in the pipe lines.

To maintain such a sprinkling system at maximum efficiency, it has been necessary to provide suitable filters or screens in the system to prevent water bugs, tadpoles, coarse sand, and other foreign matter which may gain entrance into the main supply or branch lines, from reaching the sprinkler heads and interrupting water flow therefrom. The water supply may be in the form of a well having a pump for forcing the water therefrom through the pipe lines of the system. In such installations the supply of water to the pipe lines and sprinkler heads may be reasonably clear of foreign matter. In other installations where the supply of water may be pumped from an open body of water, such as a lake or river, water bugs, tadpoles and other foreign matters, is likely to be entrained with the water pumped into the pipe line, whereby such foreign matter may clog the sprinkler heads and render them inoperative.

The primary object of the present invention therefore is to provide a sand trap having means for readily operatively connecting it in the main supply or branch lines of an irrigation system, whereby all of the water delivered thereto from the water supply must pass through the sand trap, whereby all foreign matter entrained with the water which may be big enough to plug the sprinkler heads is removed from the flow of water and is retained in the sand trap, thereby assuring that the sprinkler heads may operate a maximum pressure and efficiency.

A more specific object of the invention is to provide a sand trap comprising an enlarged elongated cylindrical housing having a suitable screen or strainer removably fixed therein the major portion of the length of the cylinder, whereby the water may pass freely through the sand trap into the main and branch lines without creating back pressure in the system.

A further object is to provide a portable sand trap for irrigation systems comprising an elongated cylindrical housing having means therein for removing foreign matter from water flowing therethrough from the source of supply to the sprinkler heads, means being provided at the ends of the housing whereby the composite sand trap may readily and quickly be detached from the main supply and branch lines for cleaning, when necessary, to maintain maximum fluid flow to the sprinkler heads at all times.

A further object is to provide a sand trap of the character described comprising an elongated cylindrical housing having a pipe section fixed to one end thereof and having a similar pipe section detachably secured to the opposite end thereof, said second pipe section having a cylindrical screen or strainer attached thereto and extending into the cylindrical housing substantially the length thereof, whereby all water entering the cylinder must pass through said screen, the cylindrical wall of the screen being spaced from the wall of the housing to permit free flow of water through the perforated wall of the screen the length thereof, the annular space surrounding the screw being adapted to receive foreign matter entering the housing from the source of water supply, if such foreign matter cannot pass through the minute passages in the surface of the screen.

A more specific object of the invention is to provide a sand trap of the class described provided at each end with an axially extending unthreaded pipe section adapted to be coupled to the adjacent ends of a main pipe or branch line by conventional slip-type couplers or coupling members, without the use of separate tools or wrenches, such as are usually necessary to effect the removal of many conventional types of sand traps now in common use.

Other objects of the invention reside in the interlocking means provided at one end of the cylindrical housing for detachably securing the screen in position within the housing; in the provision of the annular flange or collar on the adjacent end of the pipe section secured to the discharge end of the trap, including the means provided on the periphery of said flange adapted for interlocking engagement with means secured to the wall of the cylinder, thereby to detachably secure the screen in position within the housing; in the provision of a simple and inexpensive sand trap comprising an enlarged elongated cylindrical housing having a reduced pipe section fixedly secured to one end thereof and having a similar pipe section detachably secured to the opposite end thereof and supporting an elongated tubular screen which extends substantially the length of the housing with its wall spaced from the wall of the housing, and said housing having a handle secured thereto, whereby the composite sand trap, when detached from the pipe line, may readily be manually lifted to an upright position to facilitate removing therefrom any foreign matter which may have accumulated therein during the operation of the system, thereby to restore the composite sand trap to its normal operation. The handle also greatly facilitates the operation of carrying the sand trap from one location to another in the field.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claim which follows.

In the drawings:

Figure 1 is a view schematically illustrating a conventional sprinkling system having the invention embodied therein;

Figure 2 is an enlarged view showing a sprinkler head in the pipe line, as viewed on line 2—2 of Figure 1;

Figure 3 is a side elevational view of the improved sand trap herein disclosed, showing the couplers for connecting it into the pipe line;

Figure 4 is a view, partially in section, showing the composite sand trap detached from the pipe line;

Figure 5 is a view showing the sand trap detached from the pipe line and supported in an upright position, as when emptying the accumulation of foreign matter therefrom;

Figure 6:
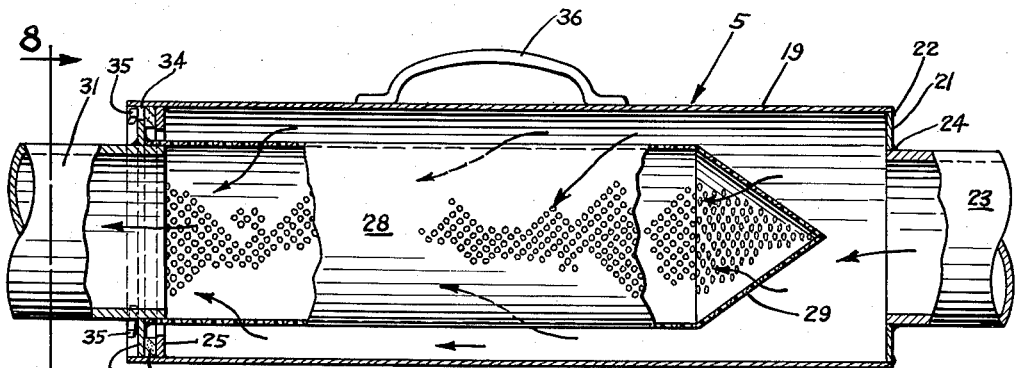
Figure 6 is an enlarged detail sectional view showing the general construction of the sand trap, and indicating the directional flow of the water therethrough.

In the selected embodiment of the invention herein disclosed, there is illustrated in Figure 1, for purposes of disclosure, a schematic representation of a conventional irrigation or sprinkling system shown comprising a main supply line 2, having one end connected to a source of water supply under pressure, such as a pump 3. The main supply pipe 2 may comprise several sections, as indicated in Figure 1, depending upon the length thereof. The pipe sections 2—2 are coupled together by conventional couplers or coupling members 4, well known in the industry.

The opposite end of the main supply pipe 2 is shown connected to a sand trap, generally designated by the numeral 5, by a coupling member 6 which may be similar in construction to coupling member 4.

The opposite or discharge end of the sand trap 5 is connected to one end of a supply line 7 by a similar coupling member 8. In Figure 1 the supply pipe 7 is shown having a lateral outlet 9 to which one end of a branch line 11 is connected by a suitable fitting 12. Conventional sprinkler heads 13, of well known construction, are interposed in the branch line 11, as is well known in the art.

In the system shown in Figure 1, a second branch line 14 is shown connected to the opposite end of the supply pipe 7 by coupling members 15 and 16 and a pipe section 17. An elbow 18 is shown connecting coupling member 16 to one end of branch line 14, and sprinkler heads 13 are interposed in branch line 14. The above described system is well known in the industry and no further explanation is therefore required.

An important feature of the present invention resides in the unique construction of the sand trap 5 whereby it may readily be detached from the pipe line 2 for cleaning, when necessary, without the use of separate tools, and also whereby it may readily be moved about from one place to another in the field.

Figure 7:
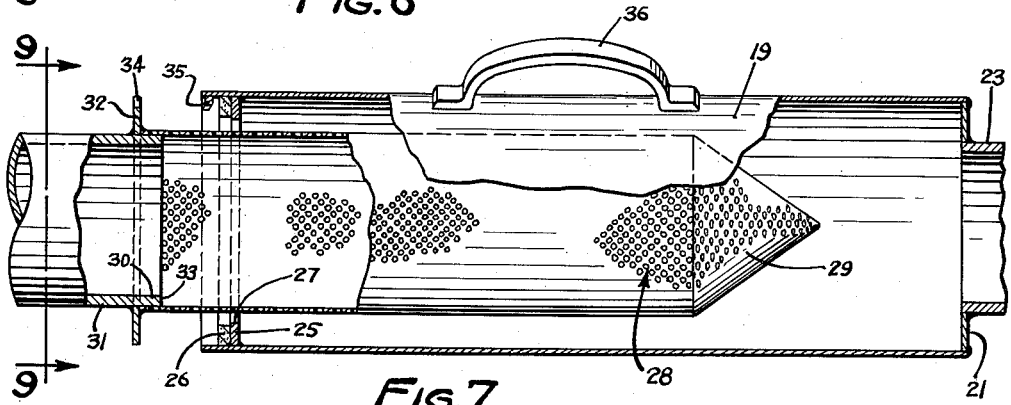
Figure 7 is a side elevational view of the sand trap, partially in section, showing the tubular screen or strainer within the cylinder partially removed therefrom.
Figures 8, 9:
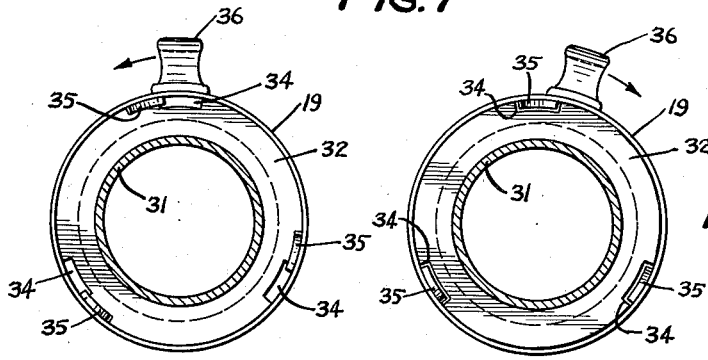
Figure 8 is a cross sectional view on the line 8—8 of Figure 6, showing the annular peripherally notched flange or ring secured to the adjacent end of the screen interlocked with the fixed lugs on the interior of the end of the cylindrical housing thereby to detachably secure the screen in position within the housing.
Figure 9 is a cross sectional view on the line 9—9 of Figure 7, showing the cylinder and screen relatively rotated to bring the interlocking lugs on the housing into registration with the notches in the annular flange of the screen to permit removal of the screen from the cylinder.

The sand trap, as best illustrated in Figures 6 and 7, comprises an elongated cylindrical housing 19 having an imperforate end wall 21 fixedly secured to one end thereof, as by welding, indicated at 22 in Figure 6. End wall 21 has a circular opening therein into which one end of a pipe section 23 is fitted and suitably secured by welding, as indicated at 24. Thus, pipe section 23 and end wall 21 become, in effect, an integral part of the cylindrical housing 19. The pipe section 23 serves as the receiving end of the sand trap, and it extends outwardly from the end wall 21 of the housing 19 of a suitable distance as, for example, six inches. The diameter of pipe section 23 corresponds substantially to the diameter of the service pipe line 2, whereby a conventional pipe coupler or coupling member 6, well known in the art, may be utilized for coupling the adjacent end of the sand trap to the pipe line 2.

Fitted into the opposite end of the cylindrical housing 19 is an annular ring or flange 25 which has its periphery welded to the housing wall, whereby the annular flange 25 may serve to provide a seat for a sealing gasket 26, shown in Figures 6 and 7. Flange 25 is spaced inwardly from the adjacent end of housing 19. Its inner edge defines a circular opening 27 through which a cylindrical screen, generally designated by the numeral 28, may be inserted, as clearly illustrated in Figures 6 and 7.

Screen 28, when fitted into the cylindrical housing 19, extends substantially the length thereof and has its inner end closed by a conical end wall 29, which is preferably perforated in a manner similar to the cylindrical wall of screen 28, to permit a portion of the water to flow therethrough, as indicated by the arrows in Figure 6. The closed end wall 29 of screen 28 is preferably conical in shape to minimize resistance to flow through the housing 19, as will be understood.

The opposite end of screen 28 is open and is shown fitted over the adjacent terminal end portion 30 of a pipe section 31, corresponding in size and length to pipe section 23 at the opposite end of the sand trap. An annular flange 32 is secured to the exterior of pipe section 31 at a point spaced inwardly from the terminal edge 33 thereof, whereby the open end of screen 28 may be fitted over the terminal end portion 30 of pipe section 31 and suitably secured thereto, as will be understood by reference to Figure 7.

Flange 32 of pipe section 31 is shown having a plurality of equi-spaced peripheral notches 34 therein adapted to receive spaced lugs 35 secured to the inner surface of the inner cylindrical wall surface of the adjacent end of housing 19, just inwardly of the open end thereof, as best illustrated in Figures 6 and 7. The lugs 35 are disposed in axially spaced relation to the fixed inwardly extending flange 25 of the housing 19 to provide ample space between lugs 35 and the gasket 26 to receive the notched flange 32 of pipe section 31.

Figure 10:
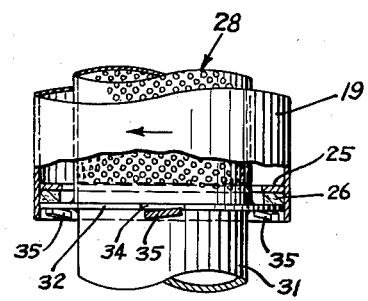
Figure 10 is a fragmentary view, partially in section, showing the interlocking means on the housing and the pipe section to which the screen is secured.

The lugs 35 are preferably slightly inclined to the adjacent end of the cylindrical housing 19, as best illustrated in Figure 10, thereby to provide a wedging action when the lugs are moved into locking engagement with the flange 32 by relative rotation of the cylindrical housing 19 with respect to pipe section 31. Such wedging action of the lugs 35 upon flange 32 will adequately compress the annular gasket 26 to prevent leakage of the water from this end of the cylinder, when the system is pressurized for sprinkling. More important, the wedging action of the lugs 35 upon flange 32 makes it possible to readily detach the end wall or flange 32 from the cylindrical housing 19 to permit the removal of the screen 28 from the cylindrical housing, when necessary.

The capacity of the open or screening area of screen 28 to fluid flow is several times greater than the capacity of pipe section 23, which is of extreme importance in order to provide free and unrestricted flow of water through the sand trap under normal operating conditions.

The sand trap is preferably constructed of a light weight rust-proof metal, such as aluminum, including the screen 28 and pipe sections 23 and 31. Housing 19 is provided with a suitable handle 36 to facilitate handling the sand trap when detached from the service line 2, as will be understood by reference to Figures 4 and 5. Figure 4 illustrates the sand trap in its simplest form, including the cylindrical housing 19, pipe sections 23 and 31 and screen 28. The coupling members 6 and 8 are, as hereinbefore stated, of well known construction. Each comprises a main body part 37 having a bore 38 therein for receiving one end of a pipe section, as indicated in Figure 3.

The form of clamping members 6 and 8 herein disclosed are, as hereinbefore stated, of conventional construction. Each comprises a base portion 39 which is extended laterally with respect to the axis of the sand trap, thereby to provide a suitable support for the sand trap to maintain it in its proper position, as shown in Figure 3.

The base portion 39 of each coupling member is shown provided with a hook-like element 41 adapted to cooperate with a downwardly extending tongue 42 provided on a clamping ring 43 which, when the system is set up for use, is fixedly clamped to pipe line 7 by tightening bolt 44, as will be understood.

A similar lock ring 45 is secured to pipe section 23 at the opposite end of the sand trap by manipulation of bolt 46, whereby its depending tongue 47 may interlock with the hook-like element 48 of coupling element 6. Coupling elements 6 and 8 are fixedly secured to their respective pipe sections by manipulation of bolts 49, as will be understood by reference to Figure 3.

From the foregoing it will thus be understood that the composite sand trap, shown in Figure 5, may readily be detached from the pipe line at anytime by simply slightly relatively rotating the sand trap with respect to pipe sections 2 and 7, thereby causing coupling members 6 and 8 to release their locking engagement with the sand trap, whereby the latter may readily be detached from the pipe line at anytime for cleaning and inspection, or for placing in another location or position in the main line or in a branch line, without the use of separate tools.

In operation, the composite sand trap is preferably interposed in the main pipe line 2 between the water supply or pump 3 and the first branch pipe 11, as illustrated in Figure 1. After the sprinkler system has been in service for the desired period of time in one place in the field, the branch lines 11 and 14 are moved to a new position. At this time the sand trap is removed, and any foreign matter which may have accumulated therein that might tend to plug the nozzles in the sprinkler heads is dumped, as indicated in Figure 5.

Such removal and cleaning of the sand trap is an extremely simple operation because of the unique manner in which the sand trap is constructed and coupled to the pipe lines 2—7. It will also be noted that such removal, cleaning and reinstallation of the sand trap may be accomplished without the use of separate tools or wrenches, which is a highly desirable attribute in a portable irrigation system, such as shown in Figure 1.

In Figure 1 two branch lines 11 and 14 are shown connected to the main supply line 2—17, back of the sand trap 5, whereby all water delivered thereto must pass through the sand trap. It will also be noted that the branch lines 11—14 extend in the same general direction from axes of the aligned main supply lines 2 and 17. It is also to be understood that the positions of the branch lines 11 and 14, with respect to the main supply lines, may be varied, as desired, as is well known in the industry, without departing from the scope of the invention and, in like manner, any number of branch lines may be utilized, depending upon the area to be irrigated and the supply of water available.

The foregoing detailed description has been given for clearness of understanding only, and no unnecessary limitations should be understood therefrom, and the appended claim should be construed as broadly as permissible in view of the prior art.

I claim as my invention:

In a sand trap of the class described, an elongated cylindrical housing having an end wall secured to the receiving end thereof, said end wall having an aperture therein of less diameter than the diameter of said housing and forming an intake for the housing, a pipe section having one end secured to said end wall and in communication with the interior of the housing through said aperture, means at the opposite end of said pipe extension for connecting it to a water supply line, an inwardly extending annular flange at the opposite end of said housing, said flange being spaced inwardly from the adjacent terminal edge of the housing and having an enlarged aperture therein forming an outlet for the housing, said flange forming an annular seat for a sealing element, a discharge pipe having an outwardly extending annular flange thereon spaced axially from the adjacent terminal of said discharge pipe, said annular outwardly extending flange being adapted to be seated against the annular inwardly extending annular flange of the housing, means for detachably securing the discharge pipe to the housing, an elongated cylindrical filter member having one end secured to the discharge pipe adjacent said outwardly extending annular flange and insertable into the housing through the discharge end thereof, said filter member extending substantially the length of the housing with its cylindrical wall spaced inwardly from the corresponding cylindrical wall of the housing to provide an elongated annular fluid circulating passage between said cylindrical walls extending the length of the housing, the inner unsupported end of the filter member having a cone-shaped wall secured thereto, the cylinder and cone-shaped walls of the filter member being perforated the extent thereof to permit water delivered into the housing from its receiving end to pass through the perforations in the walls of the filter member and housing, thereby to remove foreign matter entrained with the water flowing through the sand trap, foreign matter accumulating in the sand trap being readily removable therefrom by detaching the sand trap and placing it on one end to permit foreign matter to gravitate therefrom, and whereby the sand trap may be thoroughly flushed out by directing a stream of water therethrough.

References Cited in the file of this patent

UNITED STATES PATENTS

| | | |
|---|---|---|
| 41,075 | Lefler | Jan. 5, 1864 |
| 284,428 | James | Sept. 4, 1883 |
| 692,377 | Speer | Feb. 4, 1902 |
| 694,440 | Stair | Mar. 4, 1902 |
| 843,991 | Bodge | Feb. 12, 1907 |
| 1,976,128 | Kupferle | Oct. 11, 1913 |
| 1,204,309 | Peterson | Nov. 7, 1916 |
| 1,472,799 | Krause | Nov. 6, 1923 |
| 2,189,361 | Hoge | Feb. 6, 1940 |
| 2,792,123 | Donato | May 14, 1957 |